(12) United States Patent
Wilson

(10) Patent No.: US 8,085,247 B2
(45) Date of Patent: Dec. 27, 2011

(54) ADVANCED FREQUENCY CALIBRATION

(75) Inventor: Thomas James Wilson, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1363 days.

(21) Appl. No.: 11/650,044

(22) Filed: Jan. 3, 2007

(65) Prior Publication Data

US 2008/0158179 A1   Jul. 3, 2008

(51) Int. Cl.
*G09G 5/00* (2006.01)

(52) U.S. Cl. .............. 345/173; 345/178; 178/18.06; 178/19.07; 324/519; 324/674; 324/675; 324/667

(58) Field of Classification Search .......... 345/173–179; 178/18.01–18.09, 19.01–19.03; 324/519, 324/672, 674, 667
See application file for complete search history.

(56) References Cited

U.S. PATENT DOCUMENTS

| | | | |
|---|---|---|---|
| 4,630,217 A | 12/1986 | Smith et al. | |
| 5,483,201 A | 1/1996 | Bortolini | |
| 5,483,261 A | 1/1996 | Yasutake | |
| 5,488,204 A | 1/1996 | Mead et al. | |
| 5,790,107 A * | 8/1998 | Kasser et al. | 345/174 |
| 5,801,340 A * | 9/1998 | Peter | 178/20.04 |
| 5,825,352 A | 10/1998 | Bisset et al. | |
| 5,835,079 A | 11/1998 | Shieh | |
| 5,854,450 A | 12/1998 | Kent | |
| 5,880,411 A | 3/1999 | Gillespie et al. | |
| 6,184,871 B1 * | 2/2001 | Teres et al. | 345/173 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,583,676 B2 * | 6/2003 | Krah et al. | 331/74 |
| 6,690,387 B2 | 2/2004 | Zimmerman et al. | |
| 6,968,017 B2 | 11/2005 | Nielsen | |
| 7,015,894 B2 | 3/2006 | Morohoshi | |
| 7,095,922 B2 * | 8/2006 | Fukuyama et al. | 385/33 |
| 7,139,530 B2 | 11/2006 | Kusbel | |
| 7,184,064 B2 | 2/2007 | Zimmerman et al. | |
| 7,663,607 B2 | 2/2010 | Hotelling et al. | |
| 7,859,522 B2 * | 12/2010 | Takahashi et al. | 345/177 |
| 2003/0164820 A1 | 9/2003 | Kent | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Quan-Zhen Wang
*Assistant Examiner* — Jennifer Nguyen
(74) *Attorney, Agent, or Firm* — Morrison & Foerster LLP

(57) ABSTRACT

An oscillating signal of relatively precise frequency is generated by tuning an oscillator using an external stable oscillating source as a reference. Calibration logic is included to compare a signal from the local oscillator to the reference signal and vary the local signal to a desired frequency. In one embodiment, a binary search algorithm is used to tune the local oscillator. The local oscillating signal can be sent to one or more circuits including at least one sensor of a touch sensitive panel for detecting touch events.

45 Claims, 9 Drawing Sheets

U.S. PATENT DOCUMENTS

| | | | |
|---|---|---|---|
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2008/0088594 | A1* | 4/2008 | Liu et al. ................ 345/173 |
| 2008/0157882 | A1 | 7/2008 | Krah |
| 2008/0158172 | A1 | 7/2008 | Hotelling et al. |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

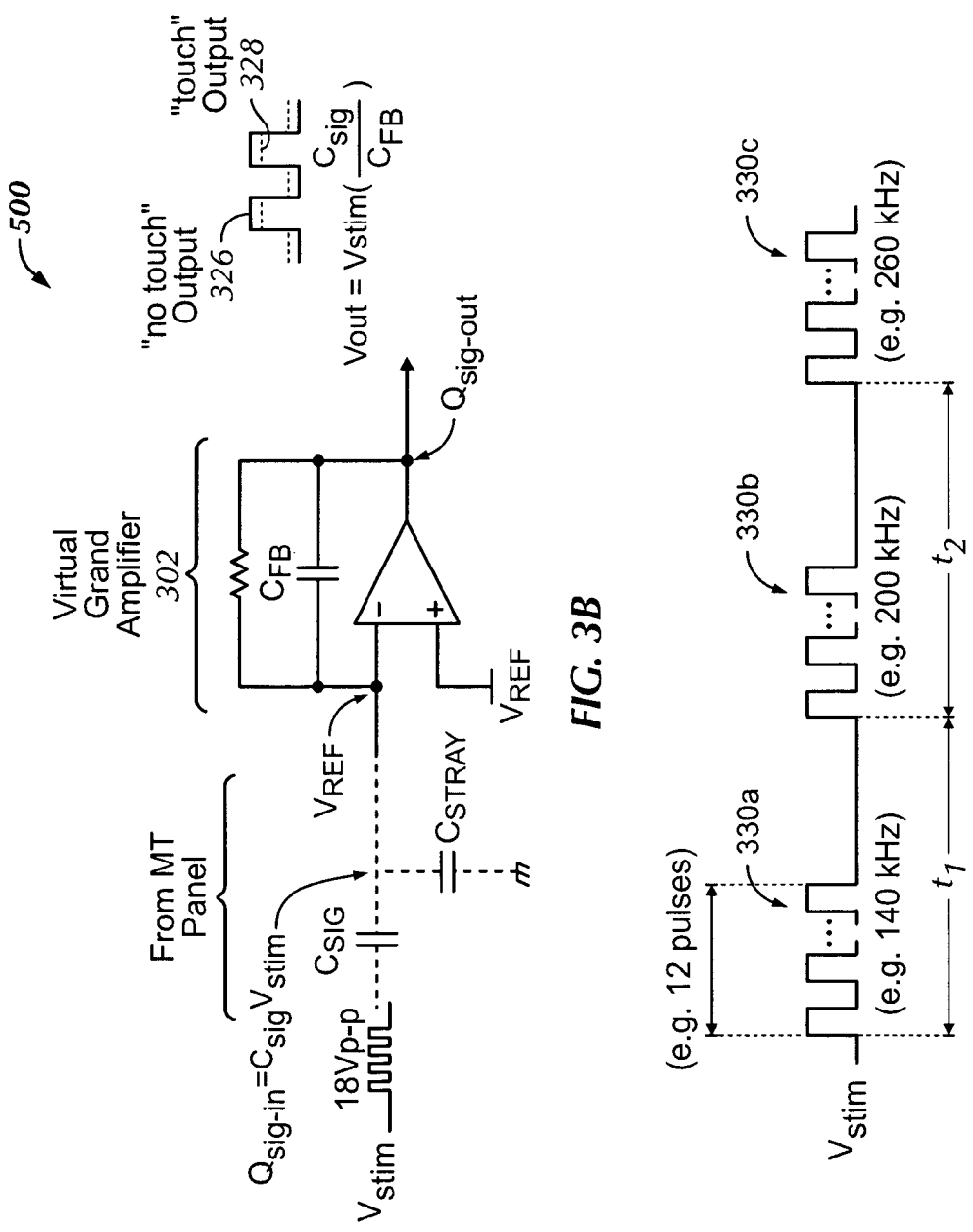

ADVANCED FREQUENCY CALIBRATION

FIELD OF THE INVENTION

The present invention relates to tuned oscillation circuits for electronic devices, and more particularly to tuning a variable oscillator to produce a precise oscillating signal.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens may include a touch panel, which may be a clear panel with a touch-sensitive surface. The touch panel may be positioned in front of a display screen so that the touch-sensitive surface covers the viewable area of the display screen. Touch screens may allow a user to make selections and move a cursor by simply touching the display screen via a finger or stylus. In general, the touch screen may recognize the touch and position of the touch on the display screen, and the computing system may interpret the touch and thereafter perform an action based on the touch event.

One limitation of many conventional touch panel technologies is that they are only capable of reporting a single point or touch event, even when multiple objects come into contact with the sensing surface. That is, they lack the ability to track multiple points of contact at the same time. Thus, even when two points are touched, these conventional devices only identify a single location, which is typically the average between the two contacts (e.g., a conventional touchpad on a notebook computer provides such functionality). This single-point identification is a function of the way these devices provide a value representative of the touch point, which is generally by providing an average resistance or capacitance value.

Moreover, many touch-panel devices use oscillating signals to power and clock electronic elements. Examples of their use include providing clock signals, or providing carrier signals which can later be modified to include information. For example, an oscillating signal can be used to drive a row in a capacitive touch sensor panel. Changes to the sensed signal indicate a touch event at the panel.

There are various known ways to create an oscillating signal. For example, persons of skill in the art would recognize that a simple circuit including an inductor and a capacitor would create such a signal. However, most circuit based oscillators suffer from the fact that they do not provide a signal with a precise and predictable frequency.

SUMMARY OF THE INVENTION

An oscillating signal of relatively precise frequency is generated by tuning a local oscillator using an external stable oscillating source as a reference. Calibration logic is included to compare a signal from the local oscillator to the reference signal and vary the local signal to a desired frequency. In one embodiment, a binary search algorithm is used to tune the local oscillator. The local oscillating signal can be sent to one or more circuits including at least one frequency sensitive element.

An oscillator circuit can include a voltage or current controlled oscillator. The circuit can include an input which receives a control signal having a particular voltage or current. The oscillator circuit can be configured to output an oscillating signal having a frequency defined by the inputted voltage or current. The oscillating signal can be sent to one or more circuits including at least one frequency sensitive element.

The calibration logic block can modify the frequency of the local oscillating signal by outputting control signals of varying magnitude. The calibration logic block can find a desired frequency in which the frequency sensitive element operates as desired.

A further aspect includes the calibration logic block performing additional scanning and mathematical operations in order to find an optimal frequency. Furthermore, the calibration logic block can monitor the local oscillating signal continuously and if, for any reason, modify the frequency as necessary.

BRIEF DESCRIPTION OF THE DRAWINGS

FIG. 3b is a more detailed illustration of a virtual ground charge amplifier at the input of an analog channel, and the capacitance contributed by a capacitive touch sensor and seen by the charge amplifier in accordance with one embodiment of the present invention.

FIG. 3c illustrates an exemplary Vstim signal with multiple pulse trains each having a fixed number of pulses, each pulse train having a different frequency Fstim in accordance with one embodiment of the present invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

A plurality of touch sensors in a multi-touch panel can enable a computing system to sense multi-touch events (the touching of fingers or other objects upon a touch-sensitive surface at distinct locations at about the same time) and perform additional functions not previously available with touch sensor devices.

Although some embodiments may be described herein in terms of capacitive touch sensors in a multi-touch panel, it should be understood that embodiments of the invention are not so limited, but are generally applicable to the use of any type of multi-touch sensor technology that may include resistive touch sensors, surface acoustic wave touch sensors, electromagnetic touch sensors, near field imaging touch sensors, and the like. Furthermore, although the touch sensors in the multi-touch panel may be described herein in terms of an orthogonal array of touch sensors having rows and columns, it should be understood that embodiments of the invention are not limited to orthogonal arrays, but may be generally applicable to touch sensors arranged in any number of dimensions and orientations, including diagonal, concentric circle, and three-dimensional and random orientations.

In general, multi-touch panels may be able to detect multiple touches (touch events or contact points) that occur at or about the same time, and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

It should be understood that although embodiments of this invention are primarily described herein for use with touch sensor panels, proximity sensor panels may also be used to generate modulated output signals for detection by the analog channels. Proximity sensor panels are described in Applicants' concurrently filed U.S. application Ser. No. 11/649,998 entitled "Proximity and Multi-Touch Sensor Detection and Demodulation," the contents of which are incorporated herein by reference.

In view of the above, although this disclosure may describe detecting input in terms of touch-events, it should be understood that the various embodiments disclosed herein may detect near touches or hover-events as well. Accordingly, a touch, a near-touch or a hover may be referred to as an "event" and multiple events that occur at or about the same time may be referred to as a "multi-event."

Figure 1:
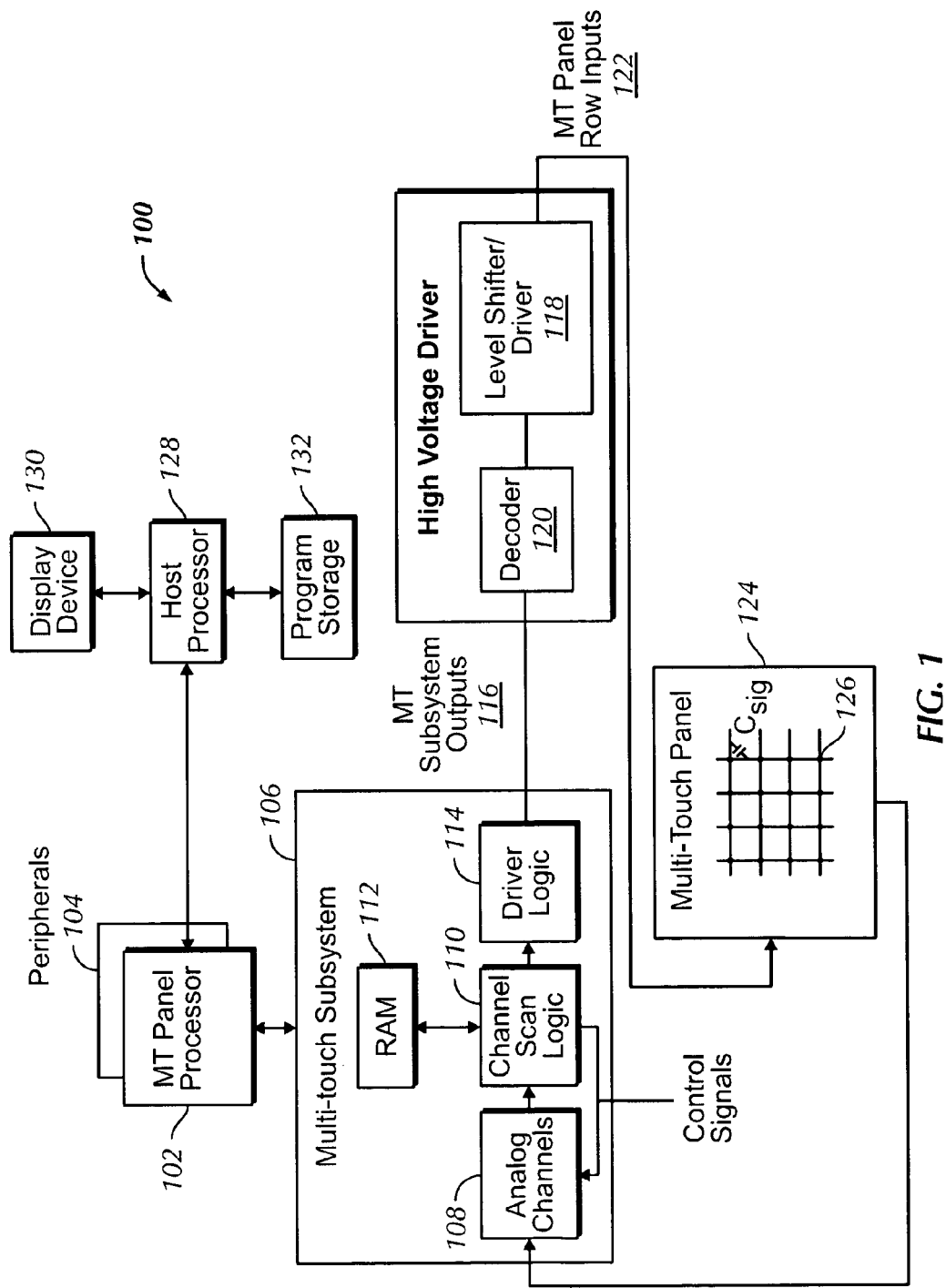
FIG. 1 illustrates an exemplary computing system using a multi-touch panel input device in accordance with one embodiment of the present invention.

FIG. 1 illustrates computing system 100 using touch sensors according to one embodiment. Computing system 100 may correspond to computing devices such as desktops, laptops, tablets or handhelds, including personal digital assistants (PDAs), digital music and/or video players and mobile telephones. Computing system 100 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 100 may include one or more multi-touch panel processors 102 and peripherals 104, and multi-touch subsystem 106. The one or more processors 102 can be ARM968 processors or other processors with similar functionality and capabilities. However, in other embodiments, the multi-touch panel processor functionality may be implemented instead by dedicated logic such as a state machine. Peripherals 104 may include, but are not limited to, random access memory (RAM) or other types of memory or storage, watchdog timers and the like. Multi-touch subsystem 106 may include, but is not limited to, one or more analog channels 108, channel scan logic 110 and driver logic 114. Channel scan logic 110 may access RAM 112, autonomously read data from the analog channels and provide control for the analog channels. This control may include multiplexing columns of multi-touch panel 124 to analog channels 108. In addition, channel scan logic 110 may control the driver logic and stimulation signals being selectively applied to rows of multi-touch panel 124. In some embodiments, multi-touch subsystem 106 may be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
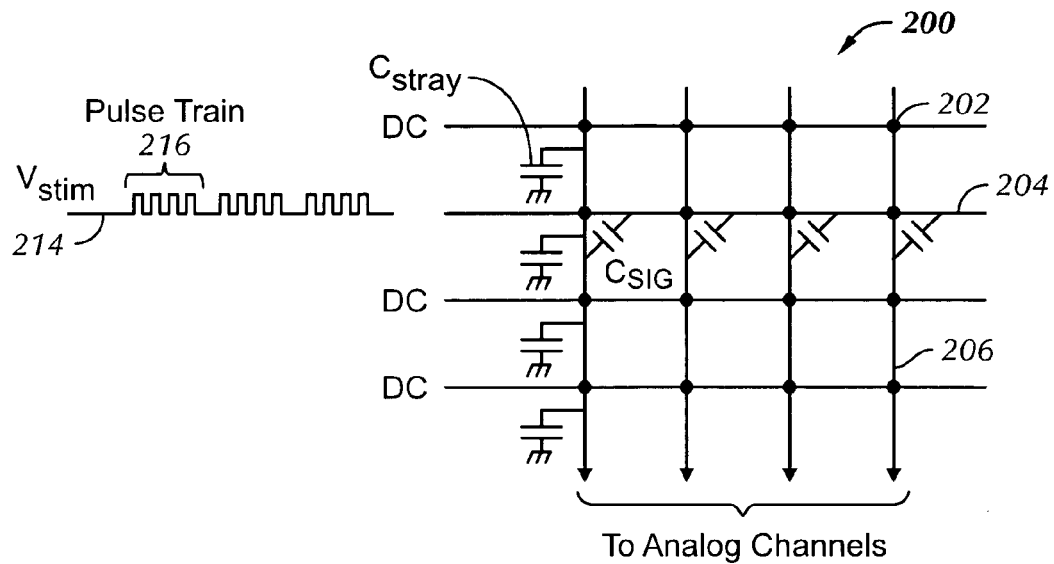
FIG. 2a illustrates an exemplary capacitive multi-touch panel in accordance with one embodiment of the present invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstim. Each of columns 206 may be selectively connectable to one or more analog channels (see analog channels 108 in FIG. 1).

Figure 2B:
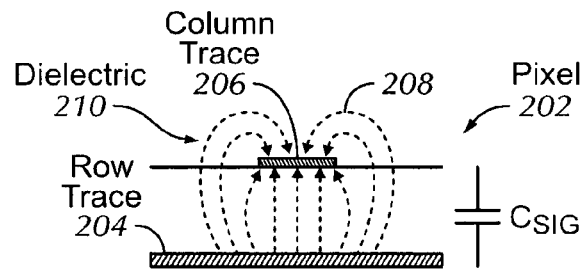
FIG. 2b is a side view of an exemplary capacitive touch sensor or pixel in a steady-state (no-touch) condition in accordance with one embodiment of the present invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 represents a signal capacitance Csig between the row and column electrodes and can cease a charge to be injected form a stimulated row to a column electrode. Since Csig is referenced to virtual ground, it also makes up a stray capacitance. For example, a total stray capacitance of a column electrode can be the sum of all signal capacitances Csig between a given column and all row electrodes. Assuming that CSig is for example 0.75 pF and a column electrode is intersected by fifteen row electrodes, the total stray capacitance on that column electrode would be at least 15×0.75 pF=11.25 pF. In reality, however, the total stray capacitance is likely larger due to a trace stray capacitance of the column electrode to the multi-touch ASIC or other stray capacitances in the system.

Figure 2C:
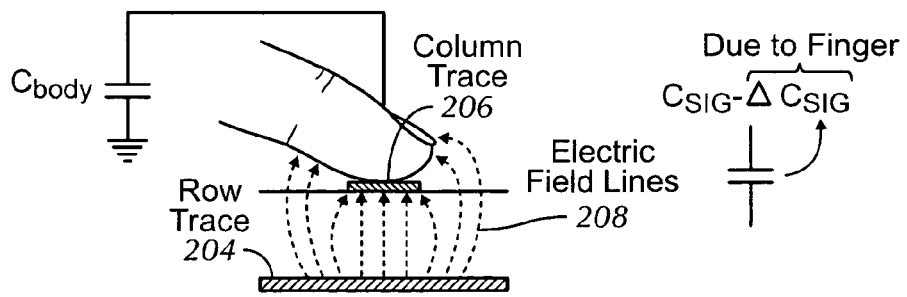
FIG. 2c is a side view of the exemplary capacitive touch sensor or pixel in a dynamic (touch) condition in accordance with one embodiment of the present invention.

FIG. 2c is a side view of exemplary pixel 202 in a dynamic (touch) condition. In FIG. 2c, finger 212 has been placed near pixel 202. Finger 212 is a low-impedance object at signal frequencies, and represents an CA ground return path to via body capacitance Cbody. The body has a self-capacitance to ground Cbody, which is a function of, among other things, body size and geometry. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by Csig_sense. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to minimize the effect of any noise sources. Vstim signal 214 essentially injects a charge into the row via signal capacitance Csig, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column can provide a result representing a mutual capacitance between a row being stimulated and a column the row is connected to. Specifically, this mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
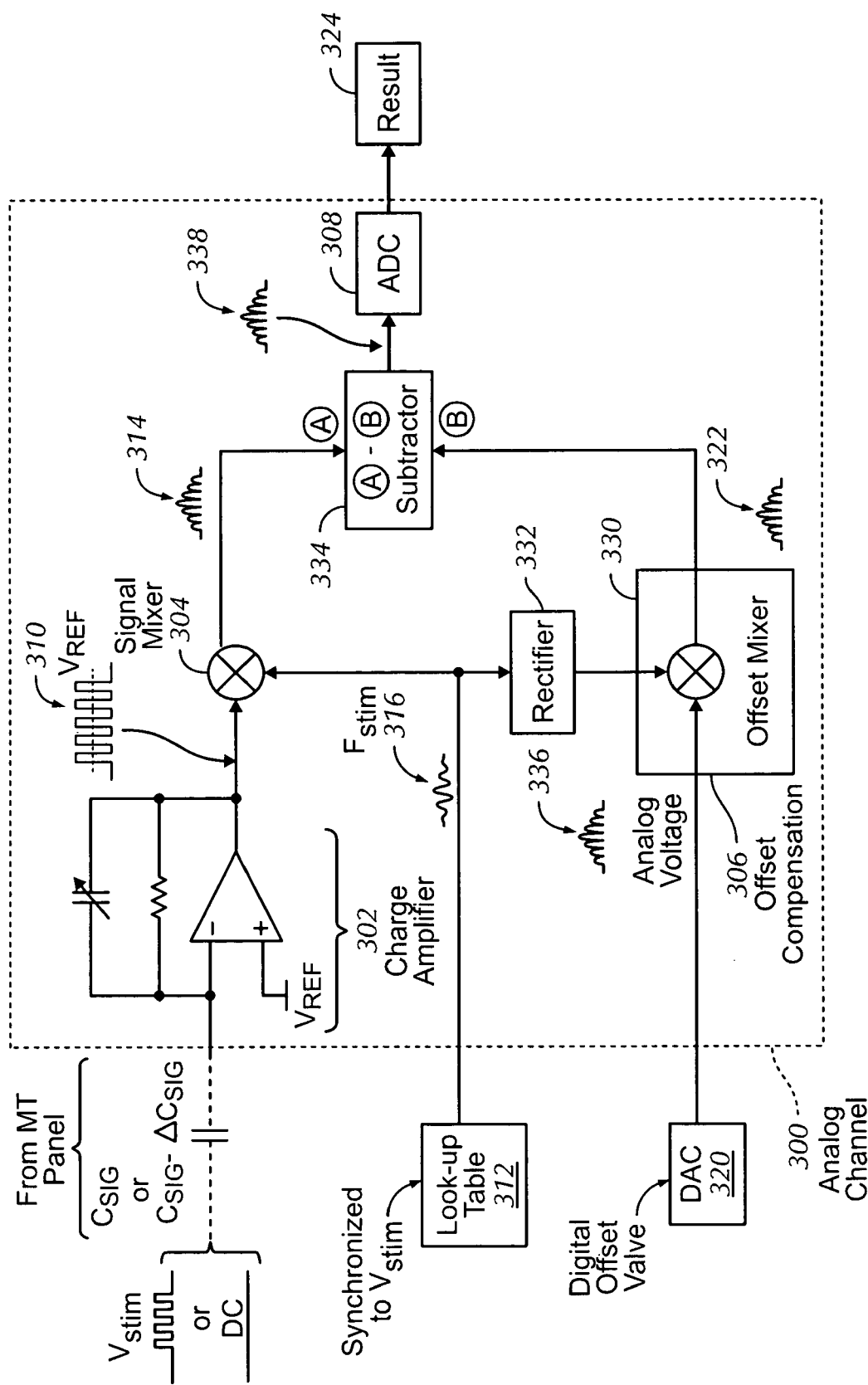
FIG. 3a illustrates an exemplary analog channel in accordance with one embodiment of the present invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302, which is equivalent to the ratio of signal capacitance Csig and preamplifier feedback capacitance Cfb. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Since the stimulation signal can be a square wave, it may be advantageous to use a sinusoidal demodulation waveform to remove the harmonics of the square wave. In order to reduce the stop band ripple of the mixer at a given stimulation frequency, it can be advantageous to use a Gaussian shaped sinewave. The demodulation waveform can have the same frequency as the stimulus Vstim and can be synthesised from a Lookuptable, enabling generation of any shape of demodulation waveform. Besides Gaussian shaped sinewaves, other waveshapes may be programmed to tune the filter characteristics of the mixers. In some embodiments, Fstim 316 may be tunable in frequency and amplitude by selecting different digital waveforms in the LUT 312 or generating the waveforms differently using other digital logic. Signal mixer 304 may demodulate the output of charge amplifier 310 by subtracting Fstim 316 from the output to provide better noise rejection. Signal mixer 304 may reject all frequencies outside the passband, which may in one example be about +/−30 kHz around Fstim. This noise rejection may be beneficial in noisy environment with many sources of noise, such as 802.11, Bluetooth and the like, all having some characteristic frequency that may interfere with the sensitive (femto-farad level) analog channel 300. Since the frequency of the signals going into the signal mixer can have the same frequency, the signal mixer may be thought of as a synchronous rectifier, such that the output of the signal mixer is essentially a rectified waveform.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the signal capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the + (noninverting) input tied to Vref, the − (inverting) input is also driven to Vref, and a DC operating point is established. Therefore, regardless of how much Csig is present, the − input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the − input, the net charge into Cstray will always be zero. Accordingly, the input charge Qsig_sense=(Csig−ΔCsig_sense)Vstim is zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

FIG. 3c illustrates an exemplary stimulation signal Vstim with multiple pulse trains 330a, 330b, 330c, each of which have a fixed number of pulses, but have a different frequency Fstim (e.g., 140 kHz, 200 kHz, and 260 kHz). With multiple pulse trains at different frequencies, a different result may be obtained at each frequency. Thus, if a static interference is present at a particular frequency, the results of a signal at that frequency may be corrupted as compared to the results obtained from signals having other frequencies. The corrupted result or results can be eliminated and the remaining results used to compute a final result or, alternatively, all of the results may be used.

As mentioned above, multi-touch system 100 has various frequency sensitive circuits and electrics elements, such as sensor nodes 126, many of which may require an accurate frequency signal to operate correctly. Accordingly, in one embodiment, a calibration system is incorporated into multi-touch system 100 to calibrate a clock source so as to ensure acceptable performance.

Figure 4:
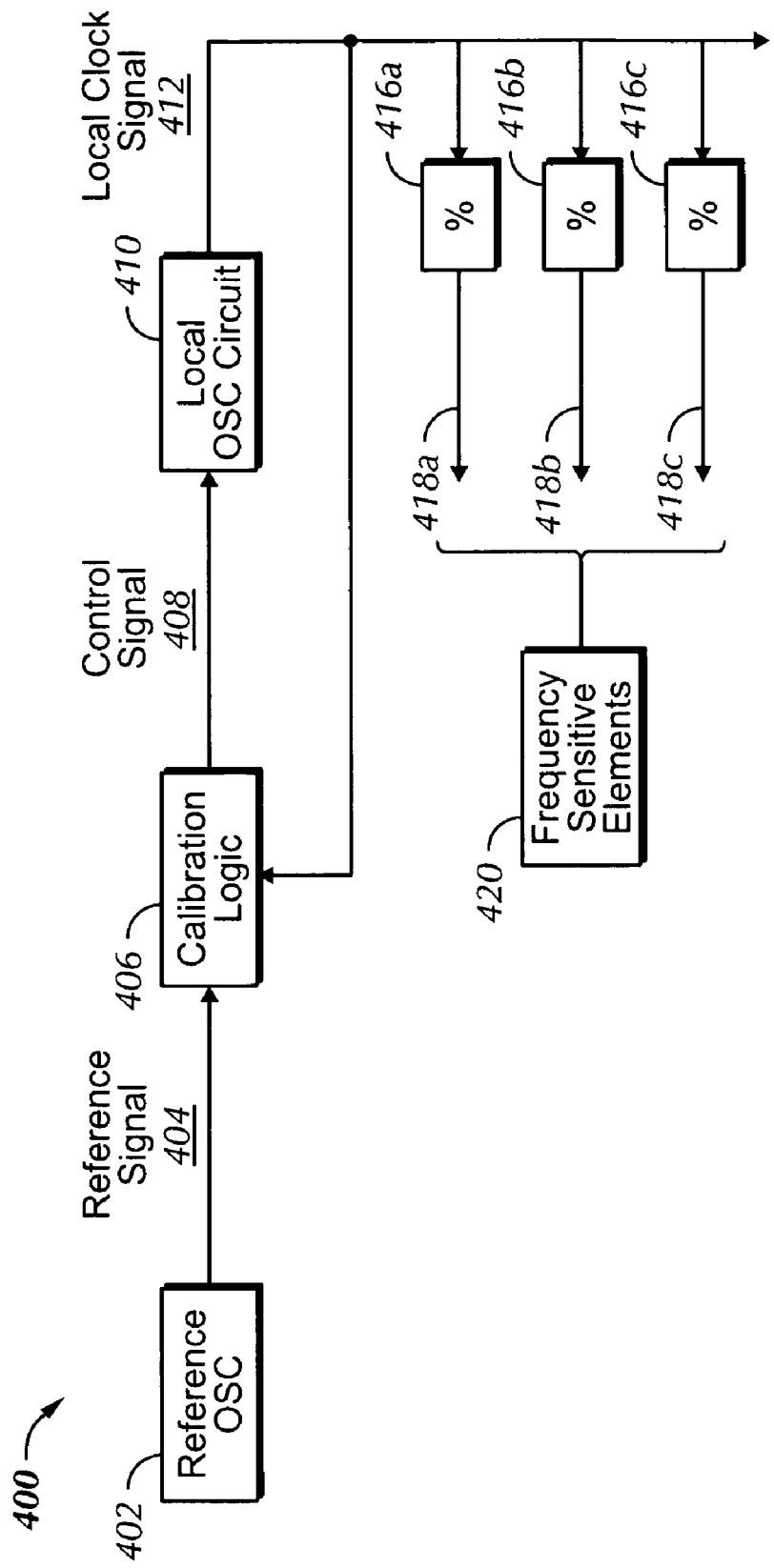
FIG. 4 is a block diagram illustrating a calibration system according to one embodiment of this invention.

Calibration system 400 in accordance with of one embodiment of the present invention is illustrated in the block diagram of in FIG. 4. Clock signal calibration system 400 includes reference oscillator 402 producing reference signal 404. Reference oscillator 402 is preferably a stable clock source that generates a known frequency. In one embodiment, reference oscillator 402 is a crystal oscillator producing a low frequency signal of about 32 kHz. Crystal oscillators can be desirable because they can operate at low power levels and do not need to be phase lock looped to an external clock source. Reference oscillator 402 can reside in multi-touch subsystem 106 or externally from multi-touch subsystem 106, such as in multi-touch panel processor block 102 or host processor block 128.

With further reference to FIG. 4, calibration logic block 406 receives reference signal 404 and generates control signal 408. Calibration logic block 406 monitors local signal 412 and can modify control output signal 408 in order to cause the local signal 412 to have an optimal or desired value. Thus, calibration logic block 406 can effectively tune the frequency of the oscillating current 412 in order to obtain an optimal or acceptable value, and thus an optimal or acceptable operation mode of the device in which the present invention is used.

Once reference signal 404 is present, calibration logic block 406 can be turned on to initiate a calibration sequence. In general, calibration block 406 calibrates local oscillator 410 so that local oscillator 410 generates a signal having a desired frequency. Local signal 410 can be fed back into calibration logic 406 for tuning local oscillator 410, as is discussed in further detail below.

In one embodiment, calibration logic block 406 comprises a state machine. A state machine can comprise logic circuitry formed using any one of a plurality of designs and technologies, including ASIC designs, field programmable gate array designs and general purpose processor technology whose operation logic is defined by software. In general, however, a state machine is formed to define operational logic to carry out the functions described herein.

In addition, local signal 412 can be used to clock and power various circuits and electronic elements of a multi-touch system 100. Clock dividers 416a, 416b, and 416c can be used to further modify local signal 412 into divided signals 418a, 418b and 418c, respectively. The divided signals 418a, 418b and 418c can be similarly used to clock various frequency sensitive elements 420. A frequency sensitive element can include a multi-touch sensor 126. The example of FIG. 4 shows three clock dividers, but a different number of dividers can be used as needed.

In one embodiment, calibration logic 406 uses a binary search algorithm to calibrate local oscillator 410. In general, a binary search is a technique for finding a particular value in a linear array by ruling out half of the remaining data at each step. A binary search finds a median, makes a comparison to determine whether the desired value comes before or after it, and then searches the remaining half in the same manner. Advantageously, a binary search is logarithmic and typically executes in less time and uses less iteration than a linear search. For example, when searching for an integer number between a range of 1 and 128, a seven bit binary search algorithm can find the number in seven iterations; in other words, one iteration per bit. In contrast, a linear search (e.g., stepping from 1 to 2 to 3 and so on) can take as many as 128 iterations.

A person of skill in the art would recognize that different embodiments can change the overall layout of the above discussed circuit 400 while preserving essentially the same function. For example, in one embodiment, local oscillator block 410 includes a voltage controlled oscillator. Varying the frequency of the voltage controlled oscillator can be accomplished by changing a digital signal applied to a digital-to-analog converter, which thereafter changes the voltage applied across the voltage controlled oscillator, as is recognized by those of ordinary skill in the art. In another embodiment, local oscillator 410 can be an n-stage ring oscillator. As is known, a tune value, such as from calibration logic 406, can be applied to an n-stage ring oscillator to change the high frequency output. In view of the above, persons of skill in the art will recognize that there are many alternate ways to vary the frequency of local signal 412.

Figure 5A:
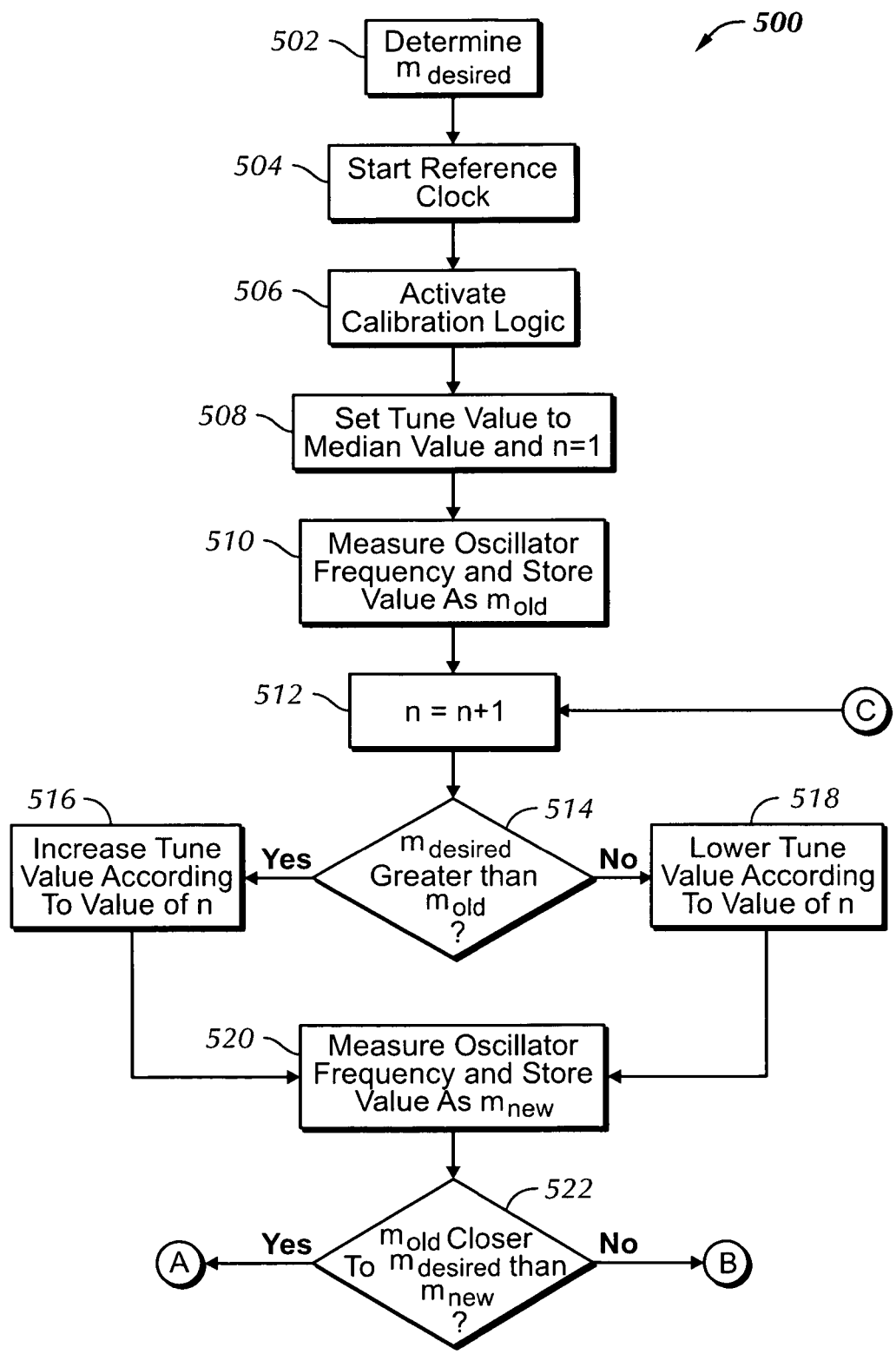
FIG. 5A-B is a flowchart illustrating operation of calibration logic tuning a local oscillator in accordance with one embodiment of the present invention.
Figure 5B:
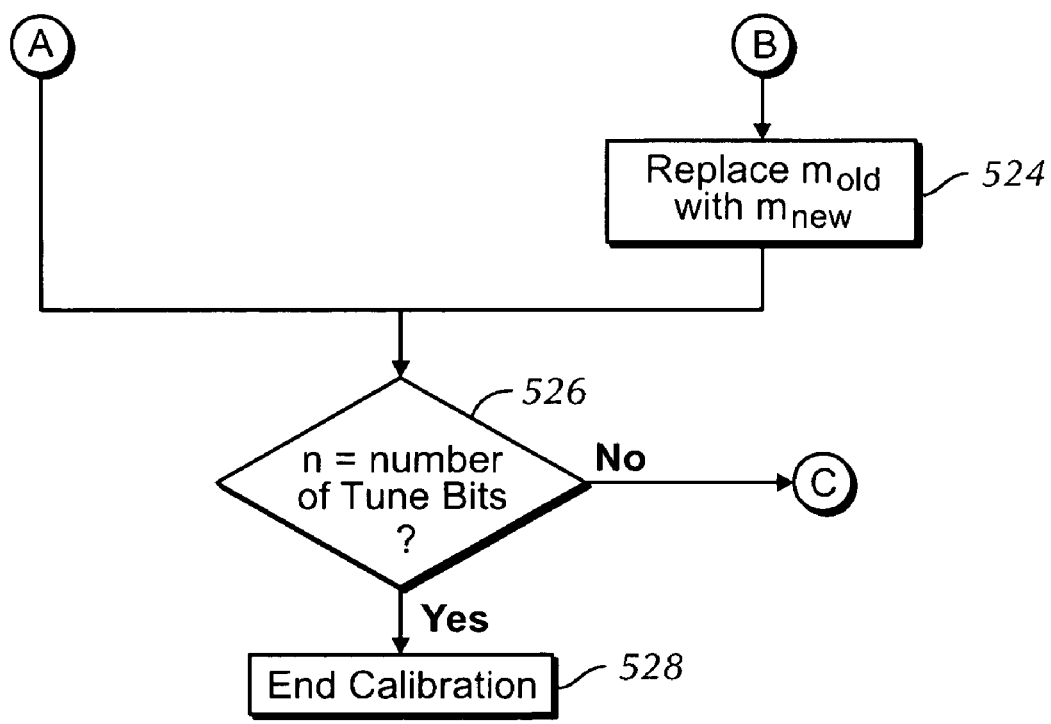

An exemplary tuning process 500 of local oscillator 410 using a binary search algorithm is illustrated in the flowchart of FIG. 5. One skilled in the art will appreciate that various timing and memory storage issues are omitted from this flowchart for the sake of clarity.

The process 500 starts at block 502. Here, a desired frequency at which local oscillator 410 is to be operated is determined. This can be done by calculating the number of cycles ($m_{desired}$) a desired frequency would have in one cycle of a reference signal. Specifically, the desired number of cycles $m_{desired}$ that are counted in one cycle of a reference signal correlates to the desired frequency. Thus, for example, if $m_{desired}$ equals 6875 (e.g., local oscillator signal 412 has 6875 cycles in one cycle of reference signal 404) and reference signal 404 has a frequency of 32 kHz, then the desired frequency of local oscillator signal 410 is 6875×32 kHz=220 MHz. In other words, $m_{desired}$ can be calculated by dividing the desired frequency of local oscillator 410 by the frequency of reference signal 404.

In one embodiment, a programmable value m can be used to set a range of available frequencies. The available frequencies can be determined by multiplying the maximum value of the programmable value m by the reference signal frequency. Thus, if the programmable value m is a thirteen bit value and the reference frequency is 32 kHz, then the range of available frequencies can be from 32 kHz (m having its decimal value of 1) to 262 MHz (m having a decimal value of 8191).

In an alternative embodiment, the programmable value m is multiplied by a granularity factor to achieve the desired frequency or corresponding $m_{desired}$. This may be desirable to reduce the number of bits needed in the programmable value m, which can be particularly advantageous when $m_{desired}$ does not need to be defined with much more precision than the precision associated with the tuning value. To illustrate, an $m_{desired}$ value of 6875 (corresponding to about 220 Mz when reference signal is 32 kHz) can be generated by multiplying an eight bit programmable value by a granularity factor of 32. The eight bit programmable value was chosen because it can provide enough precision in combination with a seven bit tuning value. Of course, the programmable value m can have more or fewer bits as desired. Furthermore, in this example, the granularity factor was determined by calculating 2 (because binary value) to the power of a value equal to the number of fewer bits used. In other words, since five fewer bits are used when using an eight bit value instead of a thirteen bit value, the granularity factor can be calculated as $2^5=32$. As can be appreciated, the above is a non-limiting example and other methods of generating a frequency can be used.

Referring again to FIG. 5, calibration logic 406 can be activated in block 504. In one embodiment, activating reference signal 404 causes calibration logic 406 to be activated (block 506) and discontinuing the reference signal 404 causes calibration logic 406 to be deactivated.

In block 508, the tune value is set to a mid point value and an incremental value n is set to 1. For example, if seven tuning bits are used to calibrate local oscillator 410, the mid point value is 64 (i.e., 1000000 in binary). In one embodiment, local oscillator 410 is initially manufactured to output a signal having a desired frequency (e.g., 220 MHz) when control signal 408 is set at the mid point value. However, the output frequencies of most voltage controlled oscillators cannot be exactly predicted as they are subject to process variation among other things. As a result, a voltage controlled oscillator may need to be tuned so that its actual output frequency is close to the desired output frequency. Accordingly, further tuning of local oscillator 410 can be done using tuning process 500.

Of note, a different numbers of tuning bits can be used to obtain a desired degree of tuning precision. Specifically, the more tuning bits used, the greater the precision. However, using more tuning bits can increase the time to perform the calibration as well as add area to the calibration circuitry. Thus, a larger number of tuning bits can increase cost (e.g., more area and circuitry) as well as power consumption. In one embodiment, the number of tuning bits that achieves sufficient precision is seven bits.

Figure 6:
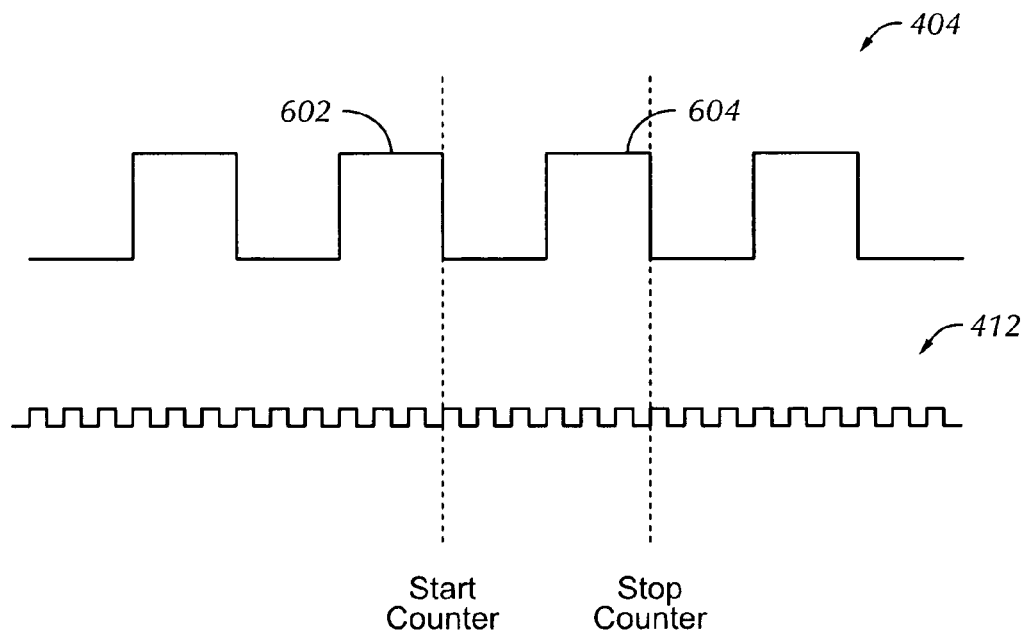
FIG. 6 is a timing sequence for counting cycles of a local oscillating signal in accordance with one embodiment of the present invention.

Referring back to FIG. 5, in block 510 the tune value (which is initially set at the mid point value) is applied to local oscillator 410 and the resulting frequency of local oscillator 410 is measured. The measured frequency is then stored as a value referred to as $m_{old}$. FIG. 6 illustrates measuring a local oscillator frequency in accordance with one embodiment. A clock counter (not shown) is activated and starts counting cycles of a local oscillator signal 412 at a first falling edge of reference signal 404. The counter then stops counting the cycles of local signal 412 at a next falling edge (i.e., after one cycle of reference signal 404). The result of the counter can then be stored in a dedicated register located in calibration logic block 406. As can be appreciated, this is only one of a number of different implementations that can be used to measure the frequency of a local oscillator. For example, in another embodiment, the counter is activated at a first rising edge and deactivated at a next rising edge.

Next, in block 512, the incremented value n is increased by one integer (i.e., n=n+1). In one embodiment, the maximum value of the incremented value n corresponds to the number of tune bits. Moreover, each time a frequency measurement is taken, n is incremented one integer. As will be described in more detail below, the value n also determines the amount a tune value is changed as well as when calibration process 500 is done.

The value $m_{desired}$ is then compared to the stored value $m_{old}$ in block 514. Here, if $m_{desired}$ is greater than $m_{old}$, then the local oscillator frequency is increased in block 516. On the other hand, the local oscillator frequency is lowered in block 518 if $m_{desired}$ is less than $m_{old}$.

Further to block 516, the local oscillator frequency can be increased by increasing the tune value. In accordance with a binary search algorithm, this can be done by adding the current tune value to the mid point value divided by the twice the number of times a measurement has been taken (i.e., the current value of n). In other words:

new tune value=current tune value+(mid point value)/(2×n)

As an example, if the mid point value has a decimal value of 64 and only one measurement has been taken (i.e., n=1), then the tune value is increased to 64+64/(2×1)=96. As a further example, if the tune value is 96 and two measurements have been taken (n=2), then the tune value can be increased to 96+64/(2×2)=112.

Figure 7:
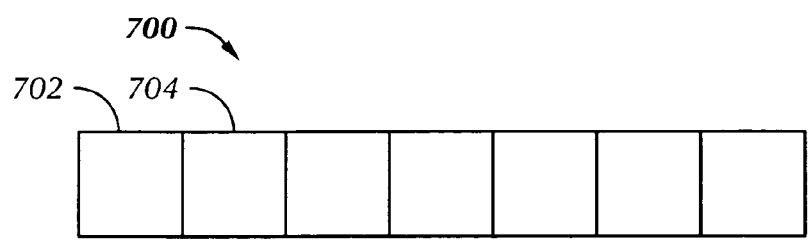
FIG. 7 depicts a seven bit binary tune value in accordance with one embodiment of the present invention.

Described another way using binary values, when increasing the tune value in step 516, the most recently changed bit is kept the same and the next most significant bit, which has a binary position corresponding to the current value of n, is changed to a value of "1". To illustrate, FIG. 7 shows a seven bit binary register 700. The most significant bit is first position bit 702. First position bit 702 is initially set to a "1" value and the remaining bits are set to "0" values to obtain the mid point tune value in block 508. If $m_{desired}$ is then determined to be greater than $m_{old}$ in block 514, then first position bit 702 remains a "1" value and the next most significant (i.e., second position bit 704) is changed to a "1" value. This increases the tune value as mentioned above. As another example, if several measurements have already been taken so that n=3, then second position bit 704 remains a "1" and the next most significant bit (in third position) is changed to a "1" value to increase the tune value.

Further to block 518, the local oscillator frequency can be lowered by lowering the tune value. Here, instead of adding a value to the tune value as was done in block 516, the tune value is subtracted by a value equal to the mid point value divided by twice the value of n. In other words:

new tune value=current tune value−(mid point value)/(2×n)

For example, if the mid point value has a decimal value of 64 and only one measurement has been taken (i.e., n=1), then the tune value is decreased to 64−64/(2×1)=32. As another example, if the tune value is 96 and two measurements have been taken (n=2), then the new tune value is decreased to 96−64/(2×2)=80.

Described another way in binary value, the most recently changed bit is changed to a "0" value and the next most significant bit, which has a position corresponding to the current value of n, is changed to a "1" value when decreasing the tune value. Referring back to the example of FIG. 7, first position bit 702 can be initially set to a "1" value to obtain the mid point tune value. If $m_{desired}$ is determined to be less than $m_{old}$ in block 514, then first position bit 702 is changed to a "0" value and the next most significant (i.e., second position bit 704) is changed to a "1" value. This decreases the tune value as mentioned above. As a further example, if n=3 and it is determined that $m_{desired}$ is to be less than $m_{old}$ in block 514, then second position bit 704 is changed to a "0" value and the next most significant bit (i.e. the bit in third position) is changed to a "1" value.

After the tune value is changed in either block 516 or block 518, the new tune value is applied to local oscillator 410 and the resulting oscillation frequency is measured in block 520. In one embodiment, this measurement is performed in a similar manner as the measurement described with reference to block 510. A resulting value from this measurement can then be stored as $m_{new}$.

Next, the absolute values of $m_{old}$ and $m_{new}$ can be compared to determine which value is closer to $m_{desired}$ in block 522. If $m_{old}$ is closer, then calibration process 500 proceeds to block 526. On the other hand, $m_{old}$ is replaced with the $m_{new}$ value in block 524 if $m_{new}$ is closer to $m_{desired}$.

In block 526, the incremented value n is compared with the total number of tune bits. If the incremented value is less than the number of tune bits, then the calibration process returns to block 512. If the numbers are the same, then the calibration process 500 is done in block 528. When done, reference signal 404 can be discontinued and calibration logic 406 can be turned off.

As can be appreciated, the accuracy of tuning process 500 is related to the number of tune bits used. Specifically, the accuracy is $\frac{1}{2^n}$ where n is the number of tune bits used. Thus, when 7 tune bits are used, the accuracy corresponds to plus or minus 0.4%.

Calibration logic 406 can perform calibration process 500 at the time of applying power to a device which incorporates embodiments of this invention. Thereafter, the tuned local oscillation frequency can be set and not changed until a reset of the device.

In alternative embodiments, calibration logic 406 can perform tuning process 500 periodically. This can be useful because the optimal frequency of oscillating signal 412 can change as device components age, as the operating environment of the device (e.g. temperature, humidity) changes, or for other reasons. Thus, by periodically performing frequency tuning, calibration logic 406 can keep the device in optimal operation by dynamically modifying the device's frequency.

In some embodiments, calibration logic 406 can continuously monitor oscillating signal 412 even in normal operation (i.e. when frequency tuning is not being performed). If calibration logic 406 detects that oscillating signal 412 deviates from desired values, it can modify the control signal 408 in order to bring oscillating signal 412 back within desired values. The control signal 408 can be modified by noting in which direction the value 412 is deviating and increasing or decreasing the control signal value 408 accordingly.

Figure 8:
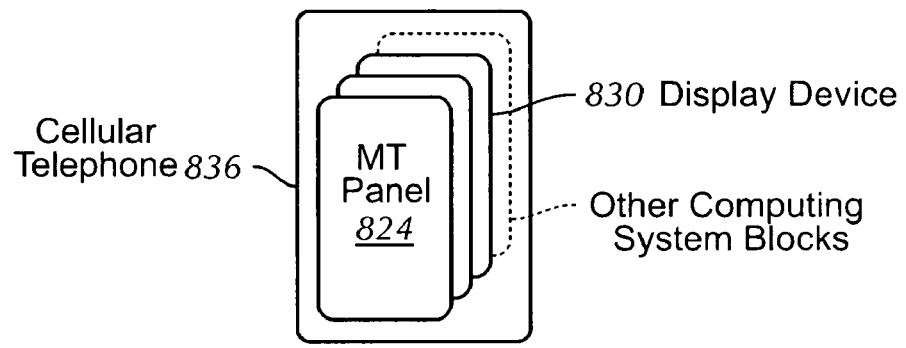
FIG. 8 illustrates an exemplary mobile telephone that may include multi-touch panel, proximity sensors, display device, and other computing system blocks in accordance with one embodiment of the present invention.

FIG. 8 illustrates an exemplary mobile (e.g., cellular) telephone 836 that may include multi-touch panel 824, display device 830, and other computing system blocks in the computing system 100 of FIG. 1. In the example of FIG. 8a, if a user's cheek or ear is detected by one or more multi-touch panel sensors, computing system 100 may determine that mobile telephone 836 is being held up to the user's head, and therefore some or all of multi-touch subsystem 106 and multi-touch panel 124 may be powered down along with display device 130 to save power.

Figure 9:
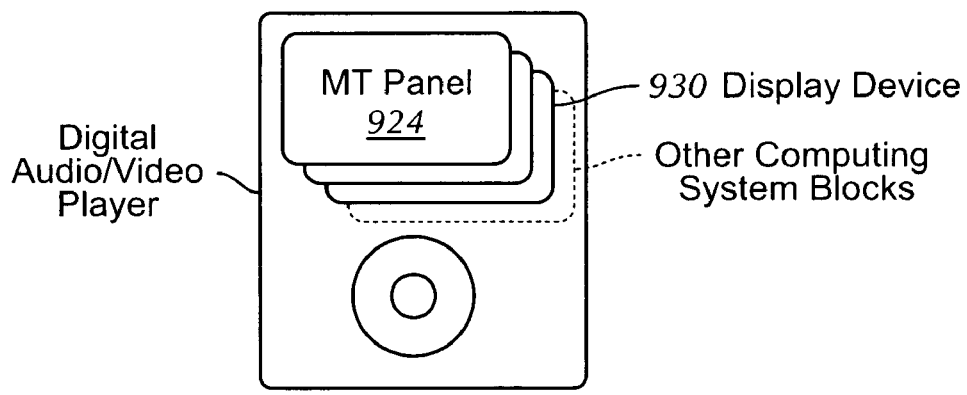
FIG. 9 illustrates an exemplary digital audio/video player that may include a multi-touch panel, proximity sensors, a display device, and other computing system blocks in accordance with one embodiment of the present invention.

FIG. 9 illustrates an exemplary digital audio/video player that may include multi-touch panel 924, display device 930, and other computing system blocks in the computing system 100 of FIG. 1.

While this invention has been described in terms of several preferred embodiments, there are alterations, permutations, and equivalents, which fall within the scope of this invention.

For example, the term "computer" does not necessarily mean any particular kind of device, combination of hardware and/or software, nor should it be considered restricted to either a multi purpose or single purpose device. Additionally, although the embodiments herein have been described in relation to touch screens, the teachings of the present invention are equally applicable to touch pads or any other type of sensor panel that detects a touch or near touch at the sensor panel.

For example, although embodiments of this invention are primarily described herein for use with touch sensor panels, proximity sensor panels, which sense "hover" events or conditions, may also be used to generate modulated output signals for detection by the analog channels. Proximity sensor panels are described in Applicants' co-pending U.S. application Ser. No. 11/649,998 entitled "Proximity and Multi-Touch Sensor Detection and Demodulation," filed on Jan. 3, 2007 the entirety of which is incorporated herein by reference. As used herein, "touch" events or conditions should be construed to encompass "hover" events and conditions and may collectively be referred to as "events." Also, "touch surface panels" should be construed to encompass "proximity sensor panels."

Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for tuning a local oscillator of an event-sensitive device, comprising:
    tuning the local oscillator to a desired frequency using a binary search algorithm;
    outputting a local oscillator signal from the local oscillator; and
    applying the local oscillator signal to at least one sensor node of an event-sensitive panel,
    wherein tuning the local oscillator to the desired frequency comprises:
        determining a desired clock count corresponding to the desired frequency of the local oscillator;
        setting a first tune bit value to a first median value within a first range of tune bit values having a first minimum value and a first maximum value;
        adjusting a first frequency of the local oscillator signal according to the first tune bit value;
        counting a first an actual clock count corresponding to the first frequency of the local oscillator signal;
        comparing the first actual clock count with the desired clock count to determine whether the first frequency of the local oscillator signal is greater or less than the desired frequency;
        setting a second tune bit value to a second median value within a second range of tune bit values having a second minimum value equal to the first minimum value within the first range of tune bit values and a second maximum value equal to the first median value if the first frequency of the local oscillator signal is greater than the desired frequency;
        setting the second tune bit value to the second median value within the second range of tune bit values having the second minimum value equal to the first median value and the second maximum value equal to the first maximum value within the first range of tune bit values if the first frequency of the local oscillator signal is less than the desired frequency;

adjusting a second frequency of the local oscillator signal according to the second tune bit value;

counting a second actual clock count corresponding to the second frequency of the local oscillator signal;

selecting the first or second frequency of the local oscillator signal that is closest to the desired frequency by selecting the first or second actual clock count that is closest to the desired clock count; and applying the selected first or second frequency of the local oscillator signal to the input of at least one sensor node of the event-sensitive device.

2. The method of claim 1, further comprising activating calibration logic circuitry.

3. The method of claim 2, wherein the activating step comprises activating a reference signal.

4. The method of claim 1, further comprising counting a number of cycles in the oscillating signal, the counting comprising starting a counter upon occurrence of a first event of a reference signal and stopping the counter upon occurrence of a second event of the reference signal.

5. The method of claim 4, wherein the first event is a first rising edge of the reference signal and the second event is a second rising edge of the reference signal.

6. The method of claim 4, wherein the counting step further comprises storing the number of cycles counted in a memory unit.

7. The method of claim 1, wherein the first or second actual clock count is a total number of cycles of the first or second frequency of the local oscillator signal counted during one cycle of a reference clock signal.

8. The method of claim 1, wherein setting the second tune bit value further comprises lowering the second tune bit value when the first actual clock count is greater than the desired clock count.

9. The method of claim 1, wherein setting the second tune bit value further comprises increasing the second tune bit value when the first actual clock count is lower than the desired clock count.

10. The method of claim 1, further comprising multiplying the first or second actual clock count by a granularity factor.

11. The method of claim 1, further comprising reducing a number of bits needed to generate a range of available frequencies corresponding to a maximum value of a range of tune bit values by multiplying the first or second actual clock count by a granularity factor.

12. The method of claim 11, further comprising determining the granularity factor by calculating 2 to the power of a value equal to a number of fewer bits used.

13. An event sensor device comprising:
a local oscillator circuit configured to generate an oscillating signal having a frequency at least partially based on an incoming control signal;

a reference signal generator configured to generate a reference signal; and calibration logic circuitry configured to compare the frequency of the oscillating signal with the frequency of the reference signal and configured to use a binary search algorithm to tune the local oscillator circuit such that the oscillating signal of the local oscillator circuit has a desired frequency, wherein the calibration logic circuitry is configured to tune the local oscillator circuit to the desired frequency by:
determining a desired clock count corresponding to the desired frequency of the local oscillator circuit;

setting a first tune bit value to a first median value within a first range of tune bit values having a first minimum value and a first maximum value;

adjusting a first frequency of the oscillating signal according to the first tune bit value;

counting a first actual clock count corresponding to the first frequency of the oscillating signal;

comparing the first actual clock count with the desired clock count to determine whether the first frequency of the oscillating signal is greater or less than the desired frequency;

setting a second tune bit value to a second median value within a second range of tune bit values having a second minimum value equal to the first minimum value within the first range of tune bit values and a second maximum value equal to the first median value if the first frequency of the oscillating signal is greater than the desired frequency;

setting the second tune bit value to the second median value within the second range of tune bit values having the second minimum value equal to the first median value and the second maximum value equal to the first maximum value within the first range of tune bit values if the first frequency of the oscillating signal is less than the desired frequency;

adjusting a second frequency of the oscillating signal according to the second tune bit value;

counting a second actual clock count corresponding to the second frequency of the oscillating signal;

selecting the first or second frequency of the oscillating signal that is closest to the desired frequency by selecting the first or second actual clock count that is closest to the desired clock count; and applying the selected first or second frequency of the oscillating signal to at least one sensor node of the event sensor device.

14. The event sensor device of claim 13, wherein the local oscillator is a voltage controlled oscillator.

15. The event sensor device of claim 13, further comprising a touch sensitive panel comprising:
a plurality of event-sensing nodes configured to receive, as an input thereto, a plurality of divided clock signals and provide one or more panel output signals; and event sensor circuitry configured to process the panel output signal to determine whether an event has occurred.

16. The event sensor device of claim 15, wherein the event-sensing nodes include at least two electrodes and output results from capacitances formed as a result of the interaction among the at least two electrodes.

17. The event sensor device of claim 13, wherein the local oscillator circuit comprises a current controlled oscillator.

18. The event sensor device of claim 13, wherein the calibration logic circuitry comprises a counter that starts counting a number of cycles in the oscillating signal upon an occurrence of a first event triggered by a reference signal and stops counting the number of cycles in the oscillating signal upon an occurrence of a second event triggered by the reference signal.

19. The event sensor device of claim 13, further comprising divider circuitry configured to divide the oscillating signal to provide at least one plurality of divided clock signals for feeding to an input of at least one event sensor node of the event sensor device.

20. The event sensor device of claim 13, wherein the calibration logic circuitry is further configured to tune the local oscillator circuit to the desired frequency by multiplying the first or second actual clock count by a granularity factor.

21. The event sensor device of claim 13, wherein the calibration logic circuitry is further configured to tune the local oscillator circuit to the desired frequency by reducing a number of bits needed to generate a range of available frequencies corresponding to a maximum value of a range of tune bit values by multiplying the first or second actual clock count by a granularity factor.

22. The event sensor device 21, wherein the calibration logic circuitry is further configured to tune the local oscillator circuit to the desired frequency by determining the granularity factor by calculating 2 to the power of a value equal to a number of fewer bits used.

23. A circuit for generating an oscillating signal comprising:
  oscillator generation means for generating an oscillating signal;
  calibration means for calibrating the oscillator generation means to a desired frequency; and
  event sensitive means, receiving as an input thereto the oscillating signal having the desired frequency, for sensing a plurality of events occurring simultaneously or nearly simultaneously on an event-sensing panel,
  wherein the calibration means uses a binary search algorithm to calibrate the oscillator generation means to the desired frequency by:
    determining a desired clock count corresponding to the desired frequency of the oscillator generation means;
    setting a first tune bit value to a first median value within a first range of tune bit values having a first minimum value and a first maximum value;
    adjusting a first frequency of the oscillating signal according to the first tune bit value;
    counting a first actual clock count corresponding to the first frequency of the oscillating signal;
    comparing the first actual clock count with the desired clock count to determine whether the first frequency of the oscillating signal is greater or less than the desired frequency;
    setting a second tune bit value to a second median value within a second range of tune bit values having a second minimum value equal to the first minimum value within the first range of tune bit values and a second maximum value equal to the first median value if the first frequency of the oscillating signal is greater than the desired frequency;
    setting the second tune bit value to the second median value within the second range of tune bit values having the second minimum value equal to the first median value and the second maximum value equal to the first maximum value within the first range of tune bit values if the first frequency of the oscillating signal is less than the desired frequency;
    adjusting a second frequency of the oscillating signal according to the second tune bit value;
    counting a second actual clock count corresponding to the second frequency of the oscillating signal;
    selecting the first or second frequency of the oscillating signal that is closest to the desired frequency by selecting the first or second actual clock count that is closest to the desired clock count; and
    applying the selected first or second frequency of the oscillating signal to at least one sensor node of the event sensitive means.

24. The circuit for generating the oscillating signal of claim 23, wherein the calibration means uses the binary search algorithm to calibrate the oscillator generation means to the desired frequency by multiplying the first or second actual clock count by a granularity factor.

25. The circuit for generating the oscillating signal of claim 23, wherein the calibration means uses the binary search algorithm to calibrate the oscillator generation means to the desired frequency by reducing a number of bits needed to generate a range of available frequencies corresponding to a maximum value of a range of tune bit values by multiplying the first or second actual clock count by a granularity factor.

26. The circuit for generating the oscillating signal 25, wherein the calibration means uses the binary search algorithm to calibrate the oscillator generation means to the desired frequency by determining the granularity factor by calculating 2 to the power of a value equal to a number of fewer bits used.

27. An electronic device comprising:
  an event sensitive panel configured to receive an oscillating signal and generate an output signal based on the received oscillating signal;
  an oscillating circuit configured to generate the oscillating signal; and
  a calibration controller configured to modify a frequency of the oscillating signal by controlling the oscillating circuit,
  wherein the controller is further configured to use a binary search algorithm to modify the oscillating circuit so that the oscillating signal is at or near a desired frequency, the controller operative for:
    determining a desired clock count corresponding to the desired frequency of the oscillating circuit;
    setting a first tune bit value to a first median value within a first range of tune bit values having a first minimum value and a first maximum value;
    adjusting a first frequency of the oscillating signal according to the first tune bit value;
    counting a first actual clock count corresponding to the first frequency of the oscillating signal;
    comparing the first actual clock count with the desired clock count to determine whether the first frequency of the oscillating signal is greater or less than the desired frequency;
    setting a second tune bit value to a second median value within a second range of tune bit values having a second minimum value equal to the first minimum value within the first range of tune bit values and a second maximum value equal to the first median value if the first frequency of the oscillating signal is greater than the desired frequency;
    setting the second tune bit value to the second median value within the second range of tune bit values having the second minimum value equal to the first median value and the second maximum value equal to the first maximum value within the first range of tune bit values if the first frequency of the oscillating signal is less than the desired frequency;
    adjusting a second frequency of the oscillating signal according to the second tune bit value;
    counting a second actual clock count corresponding to the second frequency of the oscillating signal;
    selecting the first or second frequency of the oscillating signal that is closest to the desired frequency by selecting the first or second actual clock count that is closest to the desired clock count; and
    applying the selected first or second frequency of the oscillating signal to at least one sensor node of the event-sensitive panel.

28. The electronic device of claim 27, wherein the output signal is also based on whether an event is occurring at the event sensitive panel.

29. The electronic device of claim 27, wherein the electronic device further comprises a reference signal generator configured to generate a reference signal and provide the reference signal to the calibration controller, wherein the calibration controller is configured to count a number of cycles occurring in the oscillating signal during a reference signal cycle.

30. The electronic device of claim 29, wherein the reference signal generator is a crystal oscillator.

31. The electronic device of claim 30, wherein the calibration controller is configured to generate a control signal comprising a digital tune value.

32. The electronic device of claim 29, wherein the electronic device is a computing system.

33. The electronic device of claim 29, wherein the electronic device is a mobile telephone.

34. The electronic device of claim 29, wherein the electronic device is a digital audio player.

35. The electronic device of claim 27, wherein the calibration controller is configured to use the binary search algorithm to modify the oscillating circuit so that the oscillating signal is at or near the desired frequency by multiplying the first or second actual clock count by a granularity factor.

36. The electronic device of claim 27, wherein the calibration controller is configured to use the binary search algorithm to modify the oscillating circuit so that the oscillating signal is at or near the desired frequency by reducing a number of bits needed to generate a range of available frequencies corresponding to a maximum value of a range of tune bit values by multiplying the first or second actual clock count by a granularity factor.

37. The electronic device 36, wherein the calibration controller is configured to use the binary search algorithm to modify the oscillating circuit so that the oscillating signal is at or near the desired frequency by determining the granularity factor by calculating 2 to the power of a value equal to a number of fewer bits used.

38. A mobile telephone comprising:
an event sensitive panel configured to receive an oscillating signal and generate an output signal based on the received oscillating signal;
an oscillating circuit configured to generate the oscillating signal; and
a calibration controller configured to control the frequency of the oscillating signal by controlling the oscillating circuit,
wherein the calibration controller is further configured to use a binary search algorithm to tune the oscillating circuit so that the oscillating signal is at or near a desired frequency, the controller operative for:
determining a desired clock count corresponding to the desired frequency of the oscillating circuit;
setting a first tune bit value to a first median value within a first range of tune bit values having a first minimum value and a first maximum value;
adjusting a first frequency of the oscillating signal according to the first tune bit value;
counting a first actual clock count corresponding to the first frequency of the oscillating signal;
comparing the first actual clock count with the desired clock count to determine whether the first frequency of the oscillating signal is greater or less than the desired frequency;
setting a second tune bit value to a second median value within a second range of tune bit values having a second minimum value equal to the first minimum value within the first range of tune bit values and a second maximum value equal to the first median value if the first frequency of the oscillating signal is greater than the desired frequency;
setting the second tune bit value to the second median value within the second range of tune bit values having the second minimum value equal to the first median value and the second maximum value equal to the first maximum value within the first range of tune bit values if the first frequency of the oscillating signal is less than the desired frequency;
adjusting a second frequency of the oscillating signal according to the second tune bit value;
counting a second actual clock count corresponding to the second frequency of the oscillating signal;
selecting the first or second frequency of the oscillating signal that is closest to the desired frequency by selecting the first or second actual clock count that is closest to the desired clock count; and
applying the selected first or second frequency of the oscillating signal to at least one sensor node of the event sensitive panel.

39. The mobile telephone of claim 38, wherein the calibration controller is configured to use the binary search algorithm to tune the oscillating circuit so that the oscillating signal is at or near the desired frequency by multiplying the first or second actual clock count by a granularity factor.

40. The mobile telephone of claim 38, wherein the calibration controller is configured to use the binary search algorithm to tune the oscillating circuit so that the oscillating signal is at or near the desired frequency by reducing a number of bits needed to generate a range of available frequencies corresponding to a maximum value of a range of tune bit values by multiplying the first or second actual clock count by a granularity factor.

41. The mobile telephone of claim 40, wherein the calibration controller is configured to use the binary search algorithm to tune the oscillating circuit so that the oscillating signal is at or near the desired frequency by determining the granularity factor by calculating 2 to the power of a value equal to a number of fewer bits used.

42. A portable audio player comprising:
an event sensitive panel configured to receive an oscillating signal and generate an output signal based on the received oscillating signal;
an oscillating circuit configured to generate the oscillating signal; and
a calibration controller configured to control the frequency of the oscillating signal by controlling the oscillating circuit,
wherein the calibration controller is further configured to use a binary search algorithm to tune the oscillating circuit so that the oscillating signal is at or near a desired frequency, the controller operative for:
determining a desired clock count corresponding to the desired frequency of the oscillating circuit;
setting a first tune bit value to a first median value within a first range of tune bit values having a first minimum value and a first maximum value;
adjusting a first frequency of the oscillating signal according to the first tune bit value;
counting a first actual clock count corresponding to the first frequency of the oscillating signal;

comparing the first actual clock count with the desired clock count to determine whether the first frequency of the oscillating signal is greater or less than the desired frequency;

setting a second tune bit value to a second median value within a second range of tune bit values having a second minimum value equal to the first minimum value within the first range of tune bit values and a second maximum value equal to the first median value if the first frequency of the oscillating signal is greater than the desired frequency;

setting the second tune bit value to the second median value within the second range of tune bit values having the second minimum value equal to the first median value and the second maximum value equal to the first maximum value within the first range of tune bit values if the first frequency of the oscillating signal is less than the desired frequency;

adjusting a second frequency of the oscillating signal according to the second tune bit value;

counting a second actual clock count corresponding to the second frequency of the oscillating signal;

selecting the first or second frequency of the oscillating signal that is closest to the desired frequency by selecting the first or second actual clock count that is closest to the desired clock count; and applying the selected first or second frequency of the oscillating signal to at least one sensor node of the event sensitive panel.

43. The portable audio player of claim 42, wherein the calibration controller is configured to use the binary search algorithm to tune the oscillating circuit so that the oscillating signal is at or near the desired frequency by multiplying the first or second actual clock count by a granularity factor.

44. The portable audio player of claim 42, wherein the calibration controller is configured to use the binary search algorithm to tune the oscillating circuit so that the oscillating signal is at or near the desired frequency by reducing a number of bits needed to generate a range of available frequencies corresponding to a maximum value of a range of tune bit values by multiplying the first or second actual clock count by a granularity factor.

45. The portable audio player of claim 44, wherein the calibration controller is configured to use the binary search algorithm to tune the oscillating circuit so that the oscillating signal is at or near the desired frequency by determining the granularity factor by calculating 2 to the power of a value equal to a number of fewer bits used.

* * * * *